(No Model.)

A. W. K. PEIRCE.
MOTOR SAFETY DEVICE.

No. 522,851.     Patented July 10, 1894.

Witnesses
Alec F. Macdonald
A. H. Orme

Inventor
Arthur W. K. Peirce
By Bentley & Blodgett
Attys.

UNITED STATES PATENT OFFICE.

ARTHUR W. K. PEIRCE, OF PLYMOUTH, MASSACHUSETTS, ASSIGNOR TO THE GENERAL ELECTRIC COMPANY, OF NEW YORK.

MOTOR SAFETY DEVICE.

SPECIFICATION forming part of Letters Patent No. 522,851, dated July 10, 1894.

Application filed October 29, 1892. Serial No. 450,336. (No model.)

*To all whom it may concern:*

Be it known that I, ARTHUR W. K. PEIRCE, a citizen of the United States, residing at Plymouth, county of Plymouth, and State of Massachusetts, have invented a certain new and useful Improvement in Motor Safety Devices, of which the following is a specification.

The aim of the present invention is to guard against injury to electrical apparatus included in a circuit of high self-induction arising from the extra discharge or so-called "kick" of the circuit when broken. I have found it especially useful for protecting from such injury the insulation of the field magnets of shunt wound motors, though it may be used in connection with other dynamo electric machines, solenoid brakes and the like. As has been heretofore proposed I provide a shunt circuit for the discharge through a resistance non-self inductive in character, and my present improvements consist principally in providing an auxiliary switch in the shunt circuit which is connected with or operated by the main circuit switch in such a way that when the main circuit is closed the shunt circuit is opened, and at the time when the main circuit is opened, or better just before rupturing the main circuit the shunt circuit is closed so that the discharge may take place in the shunt circuit thus guarding against injury to the protected apparatus in a manner well understood.

Figure 1:
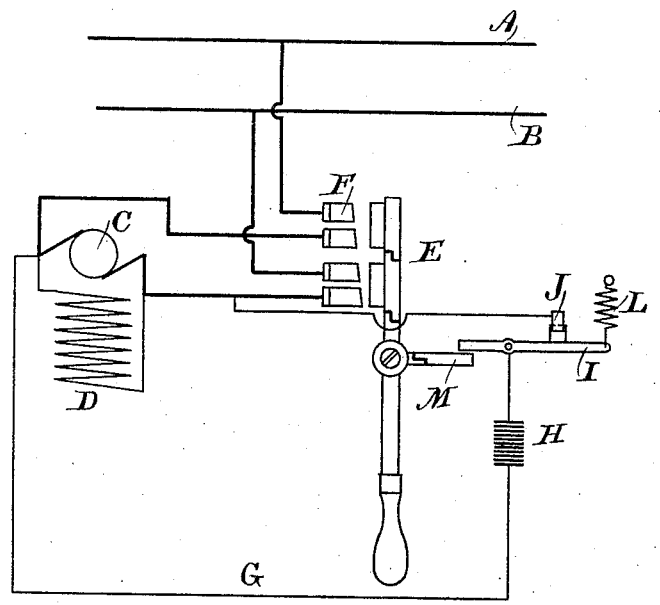
Figure 2:
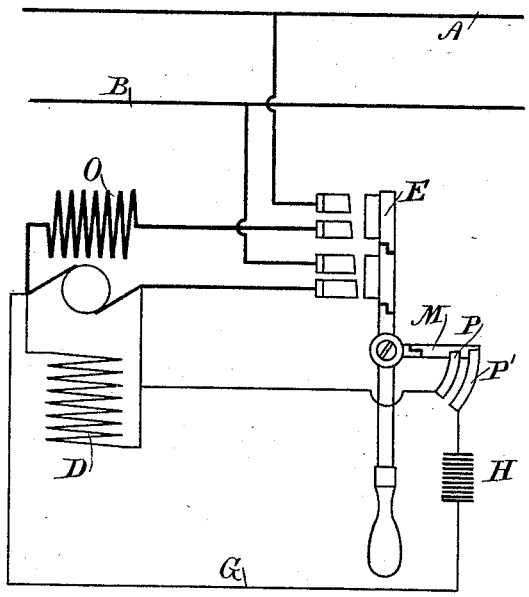

In the accompanying drawings, Figures 1 and 2 illustrate diagrammatically two modified forms of my invention, wherein—

A and B represent a line circuit and C an electric motor having a shunt winding D supplied with current from the mains. As before indicated, however, other apparatus than such a motor may be protected in the same manner, and the invention is not necessarily limited to the motor shown. A switch E opens and closes the main circuit at the contacts F, but around the shunt winding D I provide a shunt circuit G including a non-inductive resistance H of an amount proportioned to the nature of the apparatus protected and the potential of the discharge likely to be received through the shunt circuit. An auxiliary switch I opens and closes the shunt circuit at contact J and is normally held closed by a spring L. Upon the main circuit switch E is an insulated arm or tappet M so arranged as to strike one end of the auxiliary switch I and open the circuit at J slightly after the main circuit is closed. When the switch is opened the spring L closes the shunt circuit just before the main circuit is ruptured.

In Fig. 2 substantially the same apparatus is shown except that the machine protected is a compound machine having a series coil O on the field as well as the shunt winding D. The auxiliary switch here consists of a pair of contacts P, P' which the conducting arm M bridges, closing the shunt circuit, just before the main circuit is opened as before.

It is to be understood that the construction of the apparatus herein described is illustrative merely, and may be varied in many ways, the points of improvement being that the main and shunt circuits are controlled by separate switches which nevertheless are so connected or related to one another that movement of the main switch effects the desired control of both circuits.

What I claim as new, and desire to secure by Letters Patent, is—

1. The combination of a dynamo electric machine with a shunt around its field circuit comprising a non-inductive resistance, a switch controlling the main circuit of a machine, and an auxiliary switch in the shunt circuit controlled by the main switch, as set forth.

2. The combination of a dynamo electric machine, with a shunt around its field circuit, a switch controlling the main circuit of the machine, and an auxiliary switch for the shunt circuit controlled by the main switch and closed by the main switch just before reaching the open circuit position.

3. The combination with an electric motor having a shunt or shunt and series field magnet winding, and a switch for connecting said motor into an electric circuit, of an auxiliary switch for connecting said shunt field through a resistance when the motor is open circuited, and controlled by the main switch in its movement, as set forth.

In testimony whereof I have hereto set my hand this 26th day of October, 1892.

ARTHUR W. K. PEIRCE.

Witnesses:
JOHN W. GIBBONEY,
BENJAMIN B. HULL.